(No Model.)　　　　　　　　　　　　　　　　　　　2 Sheets—Sheet 1.
T. G. TURNER.
FISHING REEL HANDLE.
No. 391,992.　　　　　　　　　　　　Patented Oct. 30, 1888.
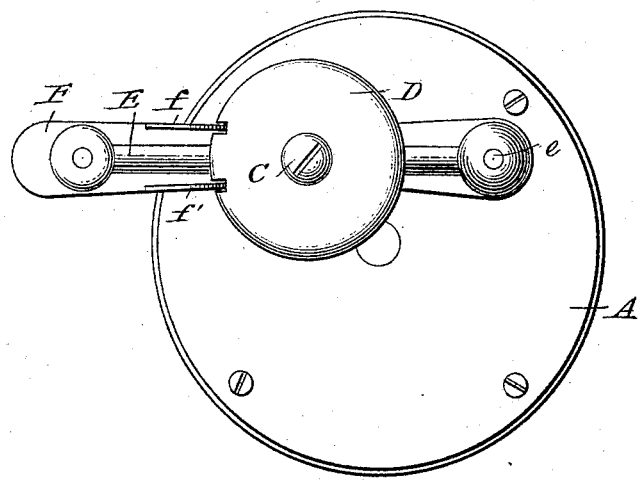
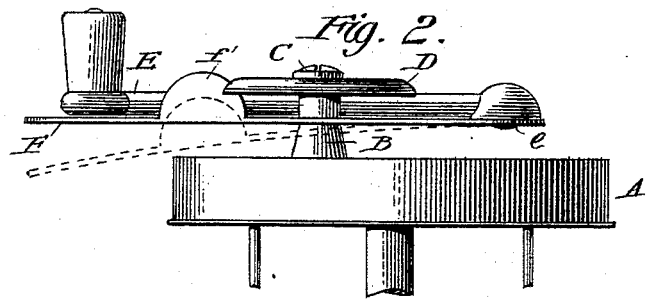
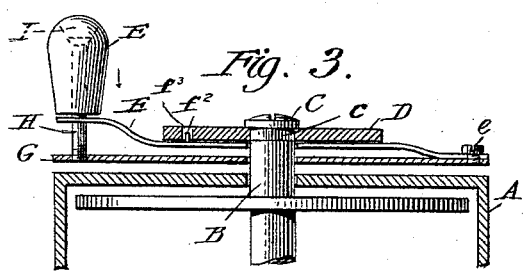
WITNESSES:
J. H. Clark.
John C. Turner.
INVENTOR:
Thomas G. Turner.

(No Model.) 2 Sheets—Sheet 2.
T. G. TURNER.
FISHING REEL HANDLE.
No. 391,992. Patented Oct. 30, 1888.
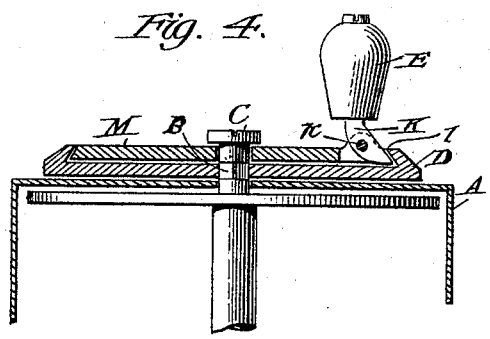
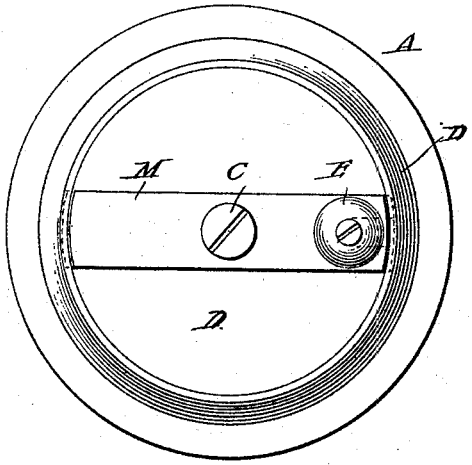
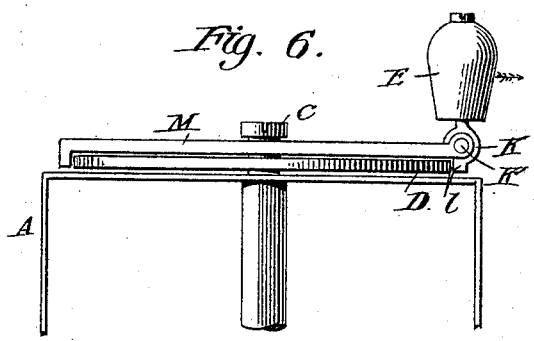
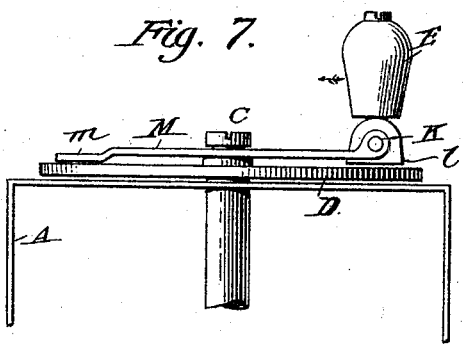
WITNESSES:
INVENTOR:
Thomas G. Turner.

UNITED STATES PATENT OFFICE.

THOMAS G. TURNER, OF NEW YORK, N. Y.

FISHING-REEL HANDLE.

SPECIFICATION forming part of Letters Patent No. 391,992, dated October 30, 1888.

Application filed August 29, 1888. Serial No. 284,006. (No model.)

*To all whom it may concern:*

Be it known that I, THOMAS G. TURNER, a citizen of the United States, and a resident of New York, in the county of New York and State of New York, have invented certain new and useful Improvements in Fishing-Reel Handles, of which the following is a specification.

My invention relates to the manner of attaching the handle to the reel, and has for its object the placing of the entire control of the line (and fish when hooked) in the one hand of the fisherman, and rendering all drags, stops, and clicks as now made useless attachments.

In the annexed drawings, Figures 2, 3, 4, 5, 6, and 7 show variations in the designing of the handle, all embodying the important feature of my invention.

In all of the designs shown like letters denote like parts.

A is the frame of the reel.

B is the shaft or spindle of the winding-gear.

C is a screw for confining the disk D to the squared end of shaft B.

E is the handle, which embraces the spindle B and engages with disk D by means of spring F, fastened to handle E by screw e, (see Figs. 2 and 3,) and in designs shown in Figs. 4, 6, and 7 by toe or extension l.

In the first two designs shown the normal condition of the spring holds the disk and handle as one part, while in the three last the handle is free to move independently of the disk, but will grip it when the user desires to manipulate the line. In each the handle and the disk are separate parts, so made that at the will of the fisherman they become more or less intimately connected.

In Fig. 1 I show ears or extensions F' of spring F, engaging with slots cut in the edge of disk D. In Fig. 3 a pin, F², engages with hole F³ in the disk, in each case holding the handle to the disk. To allow the disk to move freely, the spring is forced out of contact. The manipulation of the spring is done by the thumb or forefinger of the hand holding the handle.

In Figs. 4, 6, and 7 the handle is formed in two parts and the spring is not used. M is the bar of the handle, extending across the disk and embracing post B under nut C, and E is the handle proper, pivoted to M at K, and being provided with toe or extension l, which is forced into contact with the rim of the disk by a lateral movement of the handle E, as shown by the arrows. In these three designs the normal conditions permit the disk and handle to move free and independent of each other. In the first two the disk and handle are held as one by the spring F; but all cover the main object of my invention, which consists in constructing the handle in such a manner that it will be more or less firmly attached to the spindle of the winding-gear, at one time firmly attached and again entirely free, at the will of the person using the reel, and controlled by a slight movement of the hand holding the handle, thus enabling the fisherman to deliver the line or recover same at will, and under any desired drag or strain on the fish. In making a cast the handle can be allowed to spin or be held.

Having thus described my invention, I claim—

The disk D, firmly attached to the spindle of the winding-gear, and handle E, provided with a clutch or grip engaging with the disk at the will of the person using the reel, thereby producing a variable drag or strain on the line when in use.

Signed at New York, in the county of New York and State of New York, this 24th day of July, A. D. 1888.

THOMAS G. TURNER.

Witnesses:
ELLIS OWEN,
H. C. MECKLEM, Jr.